US009576343B2

(12) United States Patent
Li et al.

(10) Patent No.: US 9,576,343 B2
(45) Date of Patent: Feb. 21, 2017

(54) SYSTEMS AND METHODS FOR A CONTENT-ADAPTIVE PHOTO-ENHANCEMENT RECOMMENDER

(71) Applicant: ARIZONA BOARD OF REGENTS ON BEHALF OF ARIZONA STATE UNIVERSITY, Tempe, AZ (US)

(72) Inventors: Baoxin Li, Tempe, AZ (US); Parag Shridhar Chandakkar, Tempe, AZ (US); Qiongjie Tian, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 14/937,772

(22) Filed: Nov. 10, 2015

(65) Prior Publication Data

US 2016/0132997 A1  May 12, 2016

Related U.S. Application Data

(60) Provisional application No. 62/077,406, filed on Nov. 10, 2014.

(51) Int. Cl.
*G06K 9/40* (2006.01)
*G06T 5/00* (2006.01)
*G06T 3/00* (2006.01)
*G06F 17/30* (2006.01)
*G06T 5/50* (2006.01)

(52) U.S. Cl.
CPC .......... *G06T 5/001* (2013.01); *G06F 17/30244* (2013.01); *G06T 3/00* (2013.01); *G06T 5/50* (2013.01); *G06T 2207/10024* (2013.01); *G06T 2207/20081* (2013.01)

(58) Field of Classification Search
CPC .......... G06T 2207/30168; G06T 5/001; G06T 7/0026; G06T 7/0028; G06T 7/0065; G06K 9/036; G06K 9/00677; H04N 21/4223
See application file for complete search history.

(56) References Cited

U.S. PATENT DOCUMENTS

| 5,991,456 A | 11/1999 | Rahman et al. |
| 8,526,728 B2 | 9/2013 | Kang et al. |
| 8,913,827 B1 * | 12/2014 | Fang ............................ 382/162 |
| 2004/0056883 A1 * | 3/2004 | Wierowski ............ G06F 3/0482 715/719 |

(Continued)

OTHER PUBLICATIONS

K. Zhu, Z. Chen, L. Ying, "Locating contagion sources in networks with partial timestamps,", ARXIV preprint available from http://arxiv.org/pdf/1412.4141.pdf, Dec. 12, 2014, pp. 1-13.

(Continued)

*Primary Examiner* — Eueng-Nan Yeh
(74) *Attorney, Agent, or Firm* — Ari M. Bai; Polsinelli PC

(57) ABSTRACT

Systems and methods for a content-adaptive photo-enhancement recommender that produces multiple enhanced images based on content and color layout parameters derived from related high-quality images are disclosed. In some embodiments, a user-uploaded image is enhanced based on parameters learned from high-quality images similar in content to the user-uploaded image and obtained using content-based image retrieval techniques.

6 Claims, 13 Drawing Sheets
(5 of 13 Drawing Sheet(s) Filed in Color)

(56) References Cited

U.S. PATENT DOCUMENTS

| | | | |
|---|---|---|---|
| 2004/0213478 | A1 | 10/2004 | Chesnokov |
| 2012/0223181 | A1* | 9/2012 | Ciampa .................... B64B 1/62 244/30 |
| 2013/0279809 | A1 | 10/2013 | Dellinger et al. |
| 2014/0010448 | A1 | 1/2014 | Lischinski et al. |
| 2014/0067679 | A1* | 3/2014 | O'Reilly ................. G06F 21/32 705/44 |

OTHER PUBLICATIONS

D. Shah and T. Zaman, "Rumors in a network: Who's the culprit?" IEEE Trans. Inf. Theory, vol. 57, pp. 5163-5181, Aug. 2011.

D. Shah and T. Zaman, "Rumor centrality: a universal source detector," in Proc. Ann. ACM SIGMETRICS Conf., London, England, UK, pp. 199-210, 2012, (published before this application Nov. 2014).

W. Luo, W. P. Tay, and M. Leng, "Identifying infection sources and regions in large networks," IEEE Trans. Signal Process., vol. 61, pp. 2850-2865, 2013, (published before this application Nov. 2014).

N. Karamchandani and M. Franceschetti, "Rumor source detection under probabilistic sampling," in Proc. IEEE Int. Symp. Information Theory (ISIT), Istanbul, Turkey, pp. 2184-2188, Jul. 2013.

W. Dong, W. Zhang, and C. W. Tan, "Rooting out the rumor culprit from suspects," in Proc. IEEE Int. Symp. Information Theory (ISIT), Istanbul, Turkey, pp. 2671-2675, Jul. 2013.

Z. Wang, W. Dong, W. Zhang, and C. W. Tan, "Rumor source detection with multiple observations: fundamental limits and algorithms," in Proc. Ann. ACM SIGMETRICS Conf., Austin, TX, Jun. 2014, pp. 1-13.

K. Zhu and L. Ying, "Information source detection in the SIR model: A sample path based approach," in Proc. Information Theory and Applications Workshop (ITA), Feb. 2013 (Arxiv preprint available from https://arxiv.org/pdf/1206.5421.pdf), 2013, pp. 1-14.

W. Luo and W. P. Tay, "Estimating infection sources in a network with incomplete observations," in Proc. IEEE Global Conference on Signal and Information Processing (GlobalSIP), Austin, TX, pp. 301-304, 2013, (published before this application Nov. 2014).

K. Zhu and L. Ying, "A robust information source estimator with sparse observations," in Proc. IEEE Int. Conf. Computer Communications (INFOCOM), Toronto, Canada, Apr.-May 2014, pp. 2211-2219.

W. Luo and W. P. Tay, "Finding an infection source under the SIS model," in Proc. IEEE Int. Conf. Acoustics, Speech, and Signal Processing (ICASSP), Vancouver, BC, May 2013, pp. 2930-2934.

Z. Chen, K. Zhu, and L. Ying, "Detecting multiple information sources in networks under the SIR model," in Proc. IEEE Conf. Information Sciences and Systems (CISS), Princeton, NJ, 2014, pp. 1-4, (Mar. 2014).

B. A. Prakash, J. Vreeken, and C. Faloutsos, "Spotting culprits in epidemics: How many and which ones?" in IEEE Conf. Data Mining (ICDM), Brussels, Belgium, pp. 11-20, 2012, (published before this application Nov. 2014).

A. Y. Lokhov, M. Mezard, H. Ohta, and L. Zdeborova, "Inferring the origin of an epidemy with dynamic message-passing algorithm," arXiv preprint arXiv:1303.5315, Mar. 21, 2013, pp. 1-9.

P. Gundecha, Z. Feng, and H. Liu, "Seeking provenance of information using social media," in Proc. ACM Int. Conf. on Information Knowledge Management (CIKM), San Francisco, California, pp. 1691-1696, 2013, (published before this application Nov. 2014).

P. C. Pinto, P. Thiran, and M. Vetterli, "Locating the source of diffusion in large-scale networks," Phys. Rev. Lett., vol. 109, No. 6, p. 068702, Aug. 10, 2012, pp. 1-5.

A. Agaskar and Y. M. Lu, "A fast monte carlo algorithm for source localization on graphs," in SProc. of SPIE vol. 8858, 2013, pp. 1-6, (published before this application Nov. 2014).

Y. Matsubara, Y. Sakurai, B. A. Prakash, L. Li, and C. Faloutsos, "Rise and fall patterns of information diffusion: model and implications," in Proc. Ann. ACM SIGKDD Conf. Knowledge Discovery and Data Mining (KDD), Beijing, China, 2012, pp. 6-14, 2012, (published before this application Nov. 2014).

R.L. Breiger and P.E. Pattison, "Cumulated Social Roles: The Duality of Persons and their Algebras", Social Networks 8, pp. 215-256 (1986), (published before this application Nov. 2014).

D. Kempe, J. Kleinberg, and E. Tardos, "Maximizing the Spread of Influence through a Social Network", n Proc. Ann. ACM SIGKDD Conf. Knowledge Discovery and Data Mining (KDD), Washington DC, pp. 137-146, 2003, (published before this application Nov. 2014).

\* cited by examiner

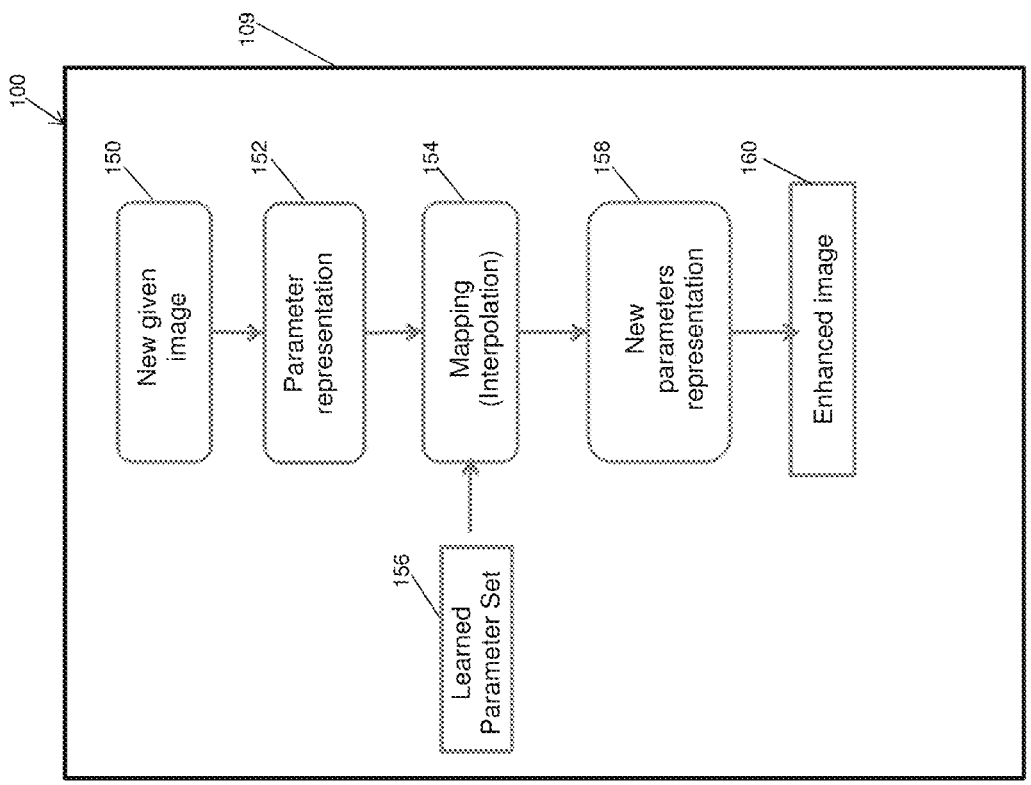
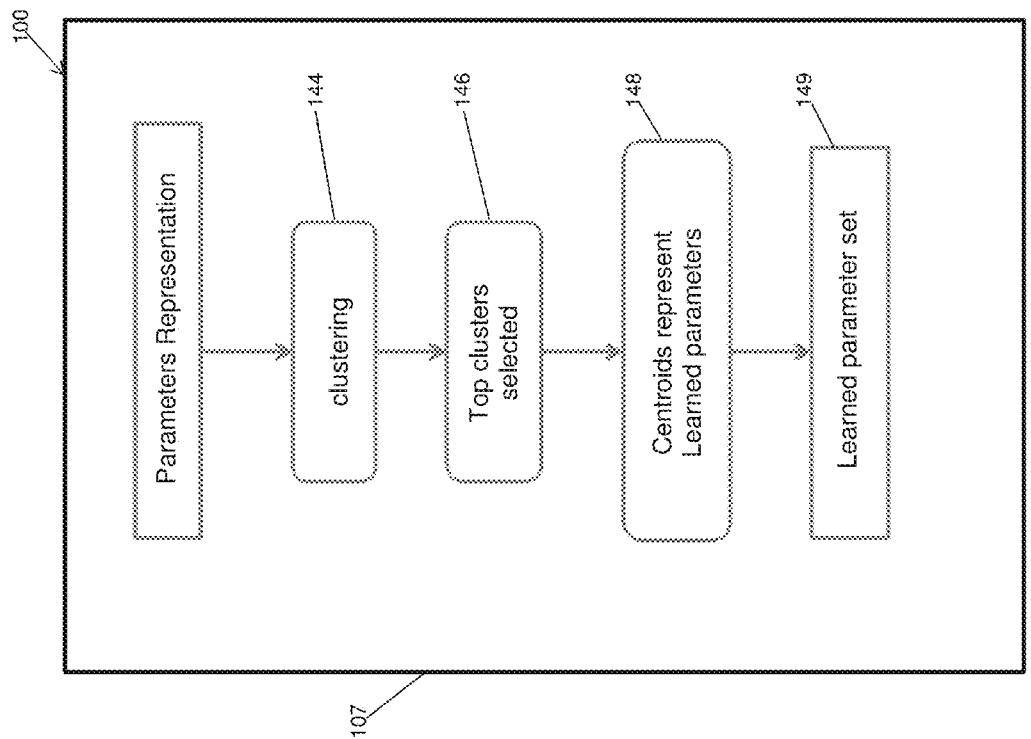
FIG. 3B
FIG. 3A

SYSTEMS AND METHODS FOR A CONTENT-ADAPTIVE PHOTO-ENHANCEMENT RECOMMENDER

CROSS REFERENCE TO RELATED APPLICATIONS

This is a non-provisional application of U.S. provisional application Ser. No. 62/077,406 filed on Nov. 10, 2014, which is herein incorporated by reference in its entirety.

FIELD

The present document generally relates to systems and methods for a dynamic image enhancement recommender, and in particular to a content-adaptive photo-enhancement recommender system for producing multiple versions of enhanced images based on the content and color layout of such images.

BACKGROUND

In today's age of social media, people upload millions of pictures every day on websites such as Flickr, Facebook, Google+, Instagram, etc. It has been found that a high-quality image on websites attracts a larger audience and hence image enhancement tools have recently been introduced as an integral part of some of these websites. However, conventional image enhancement tools on such websites are not content-adaptive or dynamic. Thus, they produce similar effects for seemingly different images, which may be undesirable. In some cases, complex post-processing operations can be performed on an image by using professional image editing software. However, such software is computationally expensive and is not portable. In addition, such software requires manual intervention and skilled knowledge about the photo-editing process. All these reasons hinder the use of such software on mobile devices. As such, there is a need for further improvements in photo-enhancement techniques and systems.

Aspects of the present disclosure address the aforementioned issues.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A is a flowchart illustrating the operation of the parameter learning module;

FIG. 3B is a flowchart illustrating the operation of the mapping module;

FIG. 5A is a color picture of an original image, while

FIG. 6A is a color picture of an original image, while FIG. 7A is a color picture of an original image, while

Corresponding reference characters indicate corresponding elements among the view of the drawings. The headings used in the figures do not limit the scope of the claims.

DETAILED DESCRIPTION

Figure 1:
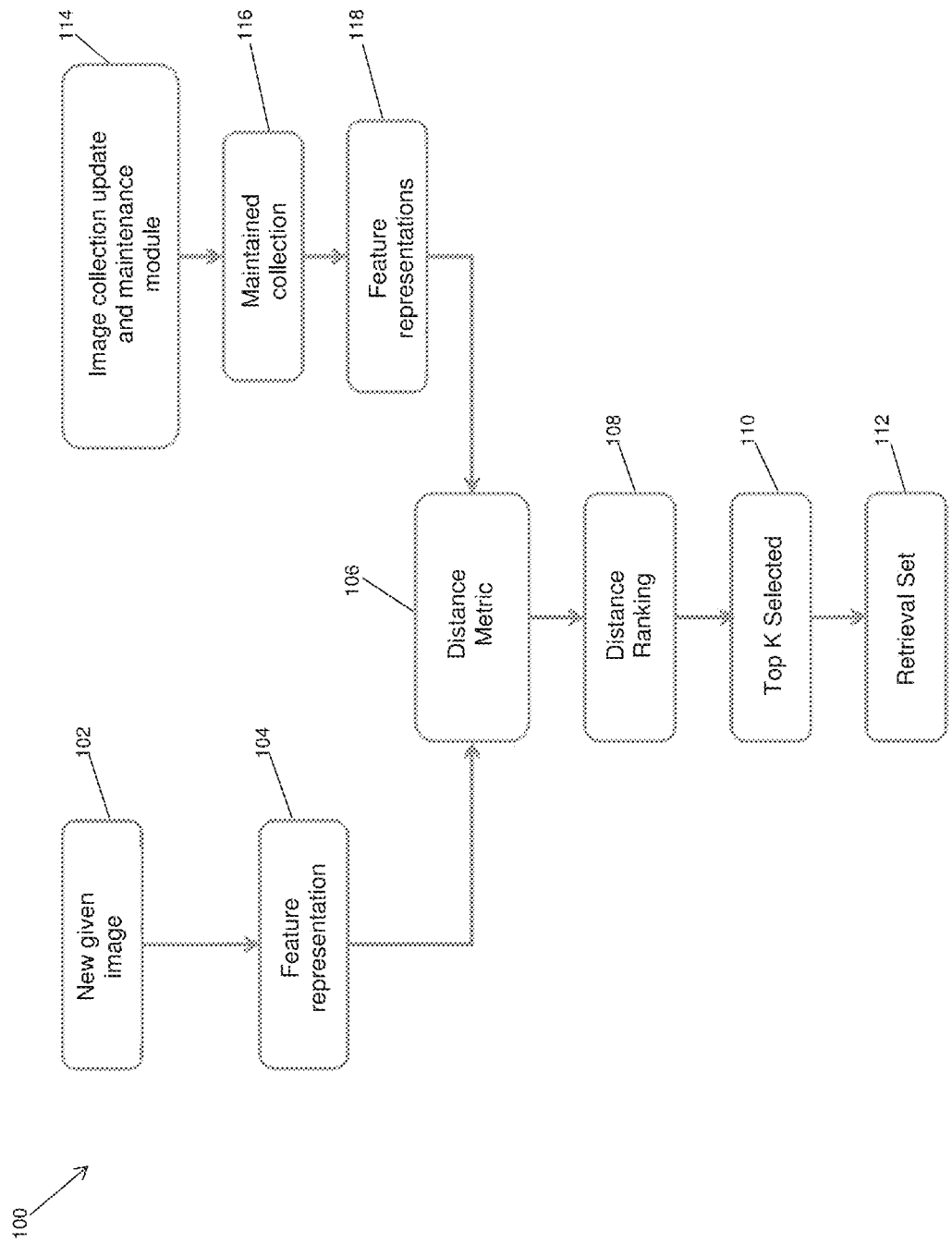
FIG. 1 is a flowchart illustrating one exemplary process flow for a content-adaptive recommender system.
Figure 2:
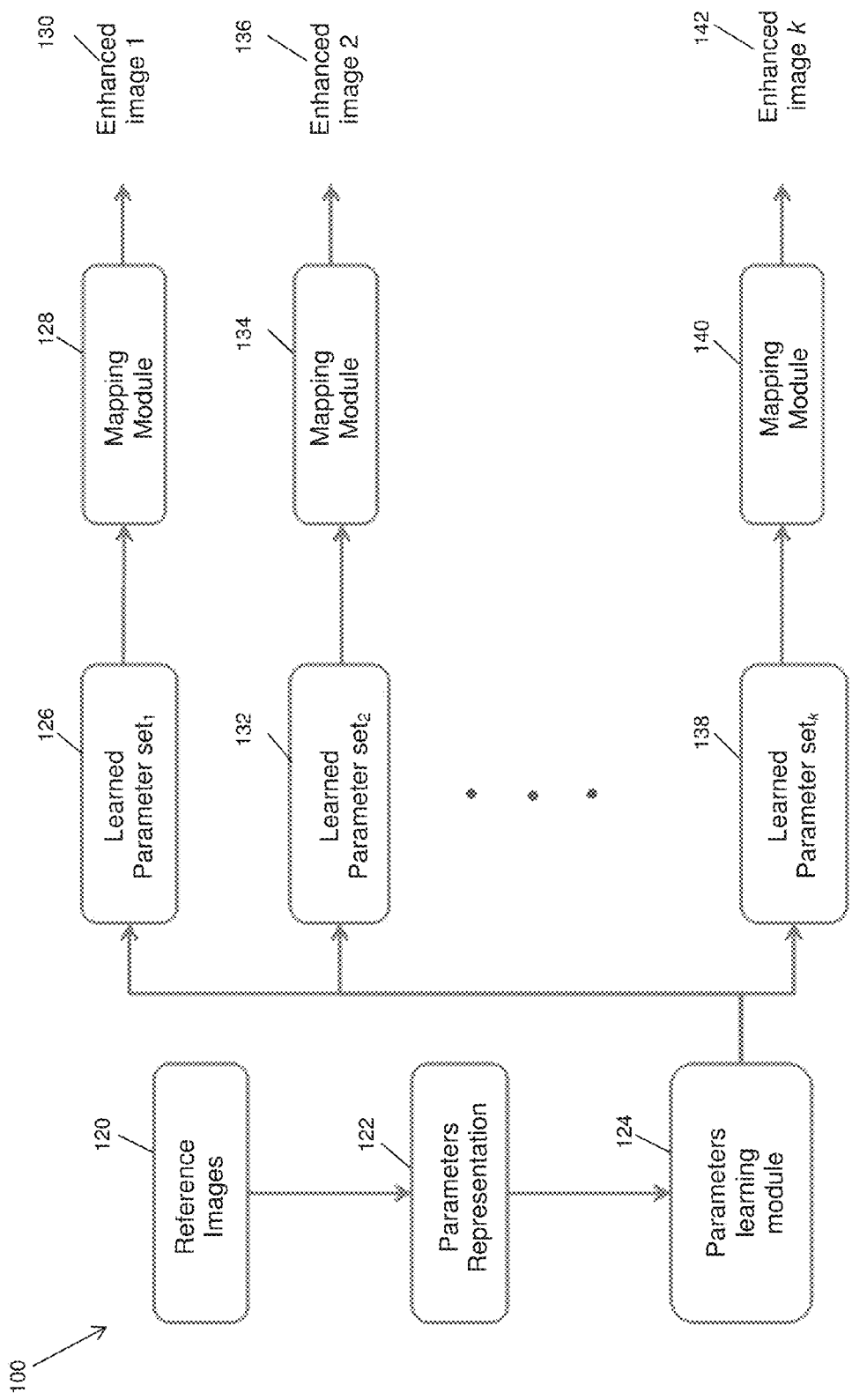
FIG. 2 is a flowchart illustrating another exemplary process flow for the content-adaptive recommender system to produce multiple enhanced images.

Aspects of the present disclosure comprise a dynamic image enhancement recommender system for producing multiple versions of enhanced images based on the content and color layout of other images are described herein. Specifically, in one embodiment, a plurality of high quality images is collected from various sources. A ranking model may be applied to the plurality of high quality images to assign a quality rank to each of the plurality of high quality images. A new image may be received. An image retrieval set may be selected from the plurality of high quality reference images based upon visual similarities between the new image and the image retrieval set. A plurality of clusters may be defined from the image retrieval set as certain reference images from the image retrieval set sharing similar visual features. Reference images of certain clusters may be converted into a color space in order to generate a plurality of attribute sets for each image of the reference images. The attribute sets define color values associated with each of the reference images. The new image may be converted into a color space in order to generate an attribute set for the new image. The attribute sets from the reference images are compared with the attribute set of the new image to generate at least one parameter. At least one parameter is applied to the attribute set of the new image to generate a modified attribute set for the new image. The new attribute set of the new image enhances the quality of the new image using the content and color layout from the reference images.

In some embodiments, the dynamic image enhancement system designated 100 is illustrated in FIGS. 1-13 may include the following features. The dynamic image enhancement recommender system 100 as disclosed is ideal for enhancing images with the aid of a large collection of reference images of high-quality images which is continuously updated to reflect current trends in photography. The dynamic image enhancement recommender system 100 may use content-based image retrieval methods to select a pool of high-quality images from the aforementioned reference image collection. Different clusters may be formed from the pool of reference images based upon attributes of the images in the reference image collection. Information from the clusters provides parameters specific for modifying each image based on its color, texture, and contents as well as providing multiple versions of enhanced images to the user. The dynamic image enhancement recommender system 100 uses learning techniques to form a parameter space for enhancing the images. The parameters may be learned separately for each cluster. The learning process may be repeated each time a user uploads a new image to the dynamic image enhancement recommender system 100. This provides image enhancement recommendations based on the characteristics of high-quality images in each cluster with the enhancement recommendations being unique to each specific new image. The image enhancement recommender system 100 may be executed by one or more processors of computing system 700 of FIG. 13. In addition, a mobile application, executed by devices remote from computing system 700, may be implemented and configured to access aspects of the image enhancement recommender system 100. In particular, the mobile application may be provided as software as a service (SaaS), an application user interface (API), or as a plug in to a preexisting application to allow end users to access system 100 and modify images using the content-specific enhancement functions disclosed herein.

Figure 4:
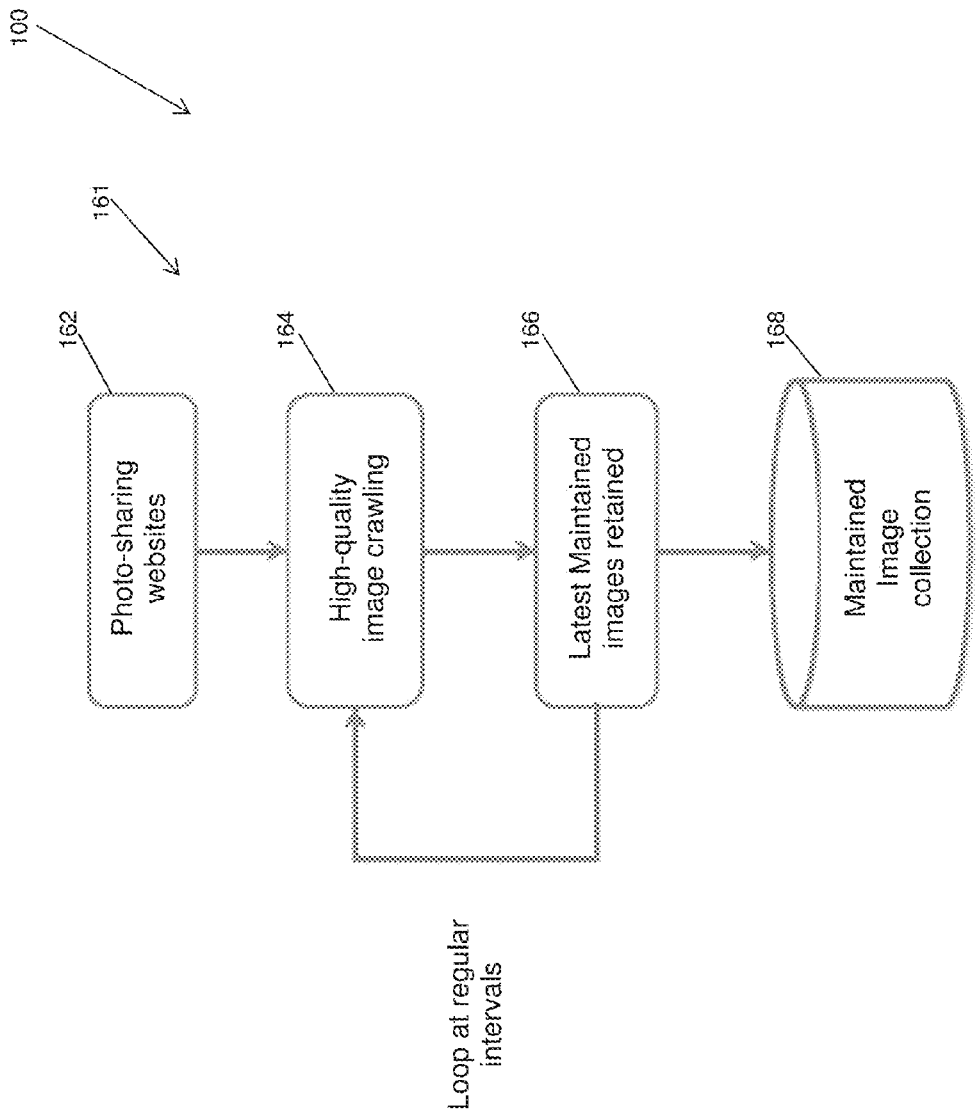
FIG. 4 is a flowchart illustrating the operation of the image collection update and maintenance module.

FIG. 4 shows the initial step of compiling a plurality of high quality images into a high-quality image collection database which may be stored within one or more storage devices in communication with computing device 700 using a collection update and maintenance module 114. More particularly, known high-quality images are collected from photo-sharing websites 162 to form a large dynamic image collection 168. The dynamic image enhancement recommender system 100 may conduct web crawling or searching 164 and may use one or more web crawlers, web spiders, ants, automatic indexes, data mining/scraping tools, bots, web scutters, browser plug-ins and add-ons, or the like to collect the high-quality images in an automated fashion. Alternatively, images may be manually downloaded from the photo-sharing websites. In some embodiments, images are assumed or known to be "high-quality" because the images are discovered and retrieved from a specific source, e.g., a specific photo-sharing website which has been predetermined to produce quality images. Certain images may also be manually added to the image collection 168 from sources other than websites such as from photo shops, graphic designers, photography studios, or the like. FIG. 4 further shows that web crawling or searching 164 may be conducted as a loop at regular intervals in order to ensure that image collection 168 is up to date with the latest high-quality images. The steps of collecting information about the images in the image collection as explained below may also be repeated at regular intervals.

Returning to FIG. 1, a new image for enhancement may be analyzed using the image collection 168. A new image 102 may be received by the computing system 700 from a device such as a mobile device. The mobile device may include a smartphone, tablet, laptop, or the like. The new image 102 may include a plurality of physical features. For example, the new image 102 may include a picture of a cabin in the forest during a sunset. Accordingly, a cabin may be shown, lighting for the sunset may be shown, and a plurality of trees from the forest may surround the cabin. The trees, sunset lighting, cabin, and other characteristics of the new image may be included within the visual features representative of the new image 102 (feature representation 104).

An image retrieval set 112 may be selected from the image collection 168 based upon similarities between certain images in the image collection 168 and the new image 102. The new image 102 and the images of the image retrieval set 112 may have common visual features, e.g., the images of the image retrieval set 112 may include high quality images from image collection 168 that depict at least one of a forest/trees, cabin, or sunset. Stated another way, the image retrieval set 112 may consist of images which are similar in visual appearance to the new image 102. Defining an image retrieval set 112 may utilize the following functions. X may be used to denote a representation of a new image 102 and DB may be used to denote the image collection database 168. A feature representation 104/118 may be used to represent one image, such as new image 102, from different aspects for example color, texture, and content. To generate the image retrieval set 112, a similarity metric may be used to find one or more similar images from DB. The similarity metric can be defined as follows:

$$\underset{i}{\operatorname{argmin}} \|x_t - x_i\|_p$$

where i∈DB. Using the above metric or similar metrics, an image from image collection 168 can be selected (and placed in an image retrieval set 112) that most closely resembles the new image 102 based upon the aspects of the images in the image collection 168. Further, by applying the similarity metric to DB K times, without replacement, a set of images, i.e., an image retrieval set 112 can be complied. In other embodiments, the image retrieval set 112 may be developed by querying the image collection 168 using general search queries. For example, the images of the image collection 168 may be assigned a plurality of physical descriptors and a natural language search may be applied to the image collection to retrieve images that have physical descriptors matching the natural language search. Distance metrics and distance rankings my further be used to develop the image retrieval set 112 as shown in FIG. 1.

Using the image retrieval set 112, one or more parameters may eventually be learned/defined to modify the new image based upon attributes of the image retrieval set. A clustering step 144 may be conducted prior to generating the parameters as depicted in FIG. 3A. In one embodiment, the images of the image retrieval set 112 are divided into a plurality of clusters 144. Specifically, a plurality of images in the image retrieval 112 set is clustered based upon similar or related visual features associated with the images. The visual features may include similar color characteristics or original visual features of individual pixels of the images in the clusters. Stated another way, the plurality of clusters 144 are defined from the image retrieval set 112 as certain images sharing visual similarities. In some embodiments, the plurality of clusters 144 are used to provide a user with multiple different ways of enhancing a new image 102.

In some embodiments, the dynamic image enhancement recommender system 100 selects a few certain top clusters and use images in those clusters as reference images 120 for further processing. In some embodiments, choosing top clusters assists in eliminating noisy images where noisy images include low-quality images that have been captured in image collection 168 by mistake and/or are not truly high-quality or useful and that need to be filtered out for purposes of image enhancement. These reference images 120 along with the new image 102 may be used to learn the enhancement parameters for the new image 102. In generating the image retrieval set 112 or the reference images 120, a histogram or the like may be used to identify visual similarities between images.

In some embodiments, different clusters may define different reference images 120 and in addition certain clusters may define predetermined filters to be applied to the new image 102 in order to ultimately enhance the new image in a variety of ways. For example, a cluster 1, defining a given set of reference images 120 may include a plurality of images of the cabin example above where lighting is very low in value, i.e., the reference images 120 of cluster 1 show the cabin during the sunset just before nightfall such that the images are much darker than other images in the image retrieval set 112. Thus, developing parameters from cluster 1 would be ideal for a user desiring to darken his/her new image 102 and/or would specifically prefer dark lighting enhancements to the new image.

The composition of an image can be described in various ways. For example, hue, saturation, brightness, and contrast are a few properties which can help to visualize and alter the image composition of an image. The dynamic image enhancement recommender system 100 selects a suitable combination of properties (also called as color space) which make it easier to alter the image composition of an image by a suitable amount. The color space may be used for converting the images. This color space may allow the dynamic image enhancement recommender system 100 to independently alter, e.g., the color saturation and lightness level of a new image. By introducing the right amount of change in properties such as saturation, contrast, lightness, and sharpness, an image can be enhanced. The color space may include a color space consisting of hue, saturation, and lightness (HSL), a red green blue (RGB) color space, or the like. The new image 102 and the reference images 120 may be converted into the color space. For example, the reference images 120 and the new image 102 may be represented into a low-dimensional feature space using their color composition in the HSL color space. The conversion of the reference images 120 and the new image 102 to a color space generates a plurality of unique color attributes specific to each reference image 120 and color attributes unique to the new image 102. In one embodiment, all the operations done on reference images can be pre-computed and stored for faster access Adjustments to values of the color attributes in the right amounts can make certain images more attractive depending on the overall composition of the image. The dynamic image enhancement recommender system 100 collects the values of these attributes from the reference images 120. The same procedure is repeated to collect these values for the new image 102. In some embodiments, the values of the color attributes are used to construct a three-dimensional look-up table with the values of the unique attributes of the reference images 120 and/or the new image 102. In one specific example, the color attributes may include Hue, Saturation, and Lightness. The dynamic image enhancement recommender system 100 uses the look-up tables to identify optimal parameters for adjusting one or more values of the color attributes of the new image 102 to more closely resemble the color attributes of the reference images 120.

After distributions for the values of the color attributes is obtained from the new image 102 and reference images 120, a linear regression may be applied to the color attributes of the new image with certain constraints which prevent a large change in the properties of the new image. The above steps may comprise a learning process which may be repeated for different reference image clusters to get multiple enhancement recommendations and/or filters. Change in the representation of low-dimensional feature space can change the enhancement recommendations for modifying the new image 102 in a variety of different ways based upon content of similar images retrieved via the image collection 168.

One specific example of the dynamic image enhancement recommender system 100 changing one of the new image 102 properties may include changes to a saturation level ("S")—a specific color attribute of the new image 120. As discussed above, the reference images 120 are converted as well as the new image 102 into an HSL color space. The images are then represented into low-dimensional feature space using their color composition in HSL space. A few top clusters may then be selected for further processing. For the purpose of parameter learning, a three-dimensional look-up table may be constructed with the values of all the unique triplets—{H, S, L}—listed. Thereafter, parameters for changing values of the color attributes of the new image 102 are learned (to enhance the image). To evaluate changes to the saturation level ("S") of the new image 102 using the reference images 120, each pair of {H, L} in the look-up table may looped and the distinct values of "S" for reference images 120 may be collected. A three-dimensional feature vector may then be formed which is represented by the minimum, median and maximum values of "$S_{min}$, $S_{med}$, $S_{max}$", which is also shown as following:

$$f_{new} = \{S_{min}^{new}, S_{med}^{new}, S_{max}^{new}\}$$

$$f_{ref} = \{S_{new}^{ref}, S_{med}^{ref}, S_{max}^{ref}\}$$

where $f_{new}$ may be the feature vector for the new image 102 while $f_{ref}$ is the feature vector for the reference image. The same procedure is repeated for the new image 102 to collect values of "S". The aim is to transform the "S" values obtained from the new image 102 into the "S" values of the reference image/s 120. In some embodiments, the range/s between values of color attributes of the new image 102 are attempted to be matched to that of the reference images 120. Least squares may be used for transformation and the process may be illustrated as such: where $$S^{new} * T = S^{ref}$$

$$T = \operatorname{argmin}_{t} \|f_{ref} - t * f_{new}\|.$$

The transformation to the "S" or values of the saturation attributes of the new image 102 changes the overall saturation level of the new image 102 and in turn enhances the image.

Multiple parameters for changing the values of color attributes of the new image 102 may be computed. The equation below shows a feature vector representation for "m" parameters.

$$f(I) = (f_{max}^1, f_{med}^1, f_{min}^1, \ldots, f_{max}^m, f_{med}^m, f_{min}^m)$$

The reference images 120 are of high-quality and are also similar in content to the new image 102. In addition, machine learning methods may be used to learn a suitable combination of parameters, and an example is shown in the equation below:

$$Y' = \begin{cases} \dfrac{(Y - Y_{med}) * (Y_{maxL} - Y_{medL})}{Y_{max} - Y_{med}} + Y_{medL} & \text{where } Y \geq Y_{med} \\ \dfrac{(Y - Y_{min}) * (Y_{medL} - Y_{minL})}{Y_{med} - Y_{min}} + Y_{minL} & \text{where } Y < Y_{med} \end{cases}$$

The above equation further illustrates that K-means clustering may be used to train multiple clusters in low-dimensional feature space of retrieved image. A few top clusters are then selected and each cluster's centroid is treated as a good combination of parameters.

For a new image, multiple combinations of parameters can be selected from different clusters created from the image retrieval set 112. For each parameter combination, values of color attributes of the new image 102 may be mapped to its corresponding learned values derived from the parameters. The maximum, median, minimum values of the parameter are first computed and then mapped to the maximum, median, and minimum values learned from the reference images 120. For the other values, interpolation approaches, such as linear interpolation, can be applied.

Figure 5B:
FIGS. 5B and 5C are color pictures of recommended enhancement images.
Figure 5C:
Figure 5A:
Figure 6C:
FIGS. 6B and 6C are color pictures of recommended enhancement images.
Figure 6B:
Figure 6A:
Figure 7C:
FIGS. 7B and 7C are color pictures of recommended enhancement images.
Figure 7B:
Figure 7A:

Sample results of an originally uploaded (new) image and two recommended enhancement images generated by the dynamic image enhancement recommender system 100 are shown in FIGS. 5A-C, 6A-C and 7A-C. In particular, FIG. 5A is the originally uploaded image, while FIGS. 5B and 5C show two recommended enhancement images generated by the dynamic image enhancement recommender system 100. Similarly, FIG. 6A depicts the originally uploaded image, while FIGS. 6B and 6C show two recommended enhancement images generated by the dynamic image enhancement recommender system 100. Finally, 7A depicts the originally uploaded image, while FIGS. 7B and 7C show two recommended enhancement images generated by the dynamic image enhancement recommender system 100.

Figure 8:
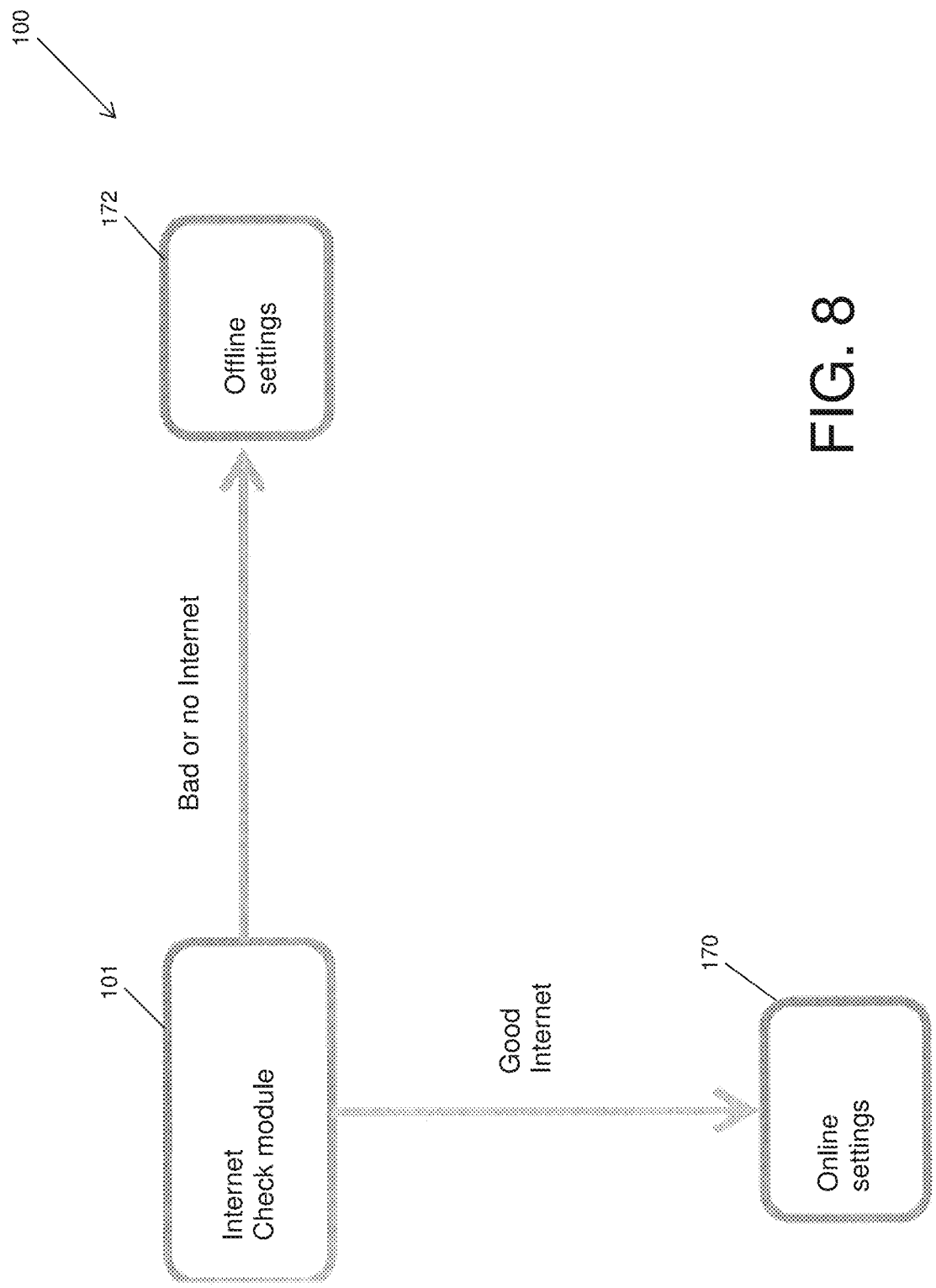
FIG. 8 is a simplified block diagram illustrating an Internet check module in the online and offline settings.

In another embodiment, the dynamic image enhancement recommender system 100 is able to work offline and online as shown in FIG. 8 using an Internet Check Module 101. The main difference between offline setting 170 and online setting 172 is that it requires a large dynamic database and computation cost is very high. Both of these settings 170 and 172 of the Internet Check Module 101 have similar work flows.

Certain aspects of the present disclosure may comprise a (1) dynamic database maintenance module and a (2) parameter learning for image enhancement module embodied in part as software code and/or logic stored on at least one memory and executed by a processor. For the dynamic database maintenance module, a dynamic database is maintained which comprises high-quality images which may be images assumed to be of higher quality depending upon the source of the images. These high-quality images may be crawled from photo-sharing websites on the Internet. Based on the uploaded time of each image, the most recent images are selected to generate an image collection. This image collection is not constant but at a regular interval, the dynamic image enhancement recommender system 100 may crawl again to update the existing database and image collection. One embodiment of using a dynamic database maintenance module as a process 161 is shown in FIG. 4. At block 162, the dynamic image enhancement recommender system 100 identifies various photo-sharing websites for high quality images. At block 164, high quality images are crawled from the photo-sharing websites. At block 166, the latest high quality images are retrieved and stored. At block 168, the image collection in the database is stored and maintained using the retained high quality images from block 166. Once block 166 is executed, the processor loops back to block 164.

The parameter learning for image enhancement module parameter may be configured as parameter learning tool for image enhancement. The main task is to learn a parameter vector which can be applied to a given new image in order to enhance the image. A suitable combination of color attributes or properties (color space) is selected to organize color values of reference images 120 and color values of a new image 102 needing enhancement. Values of the images are identified based upon the color space used. Values for the color attributes of the reference images may be collected from a particular image cluster. Values of the color attributes of the new image may be identified based upon the new image as converted/applied to the color space. Distributions for the values obtained from the new image as well as the reference images may be calculated. A linear regression may be applied with certain constraints which prevents change in the properties of the new images 102. The learning process may be repeated for multiple clusters to produce multiple enhancement recommendations.

Figure 9:
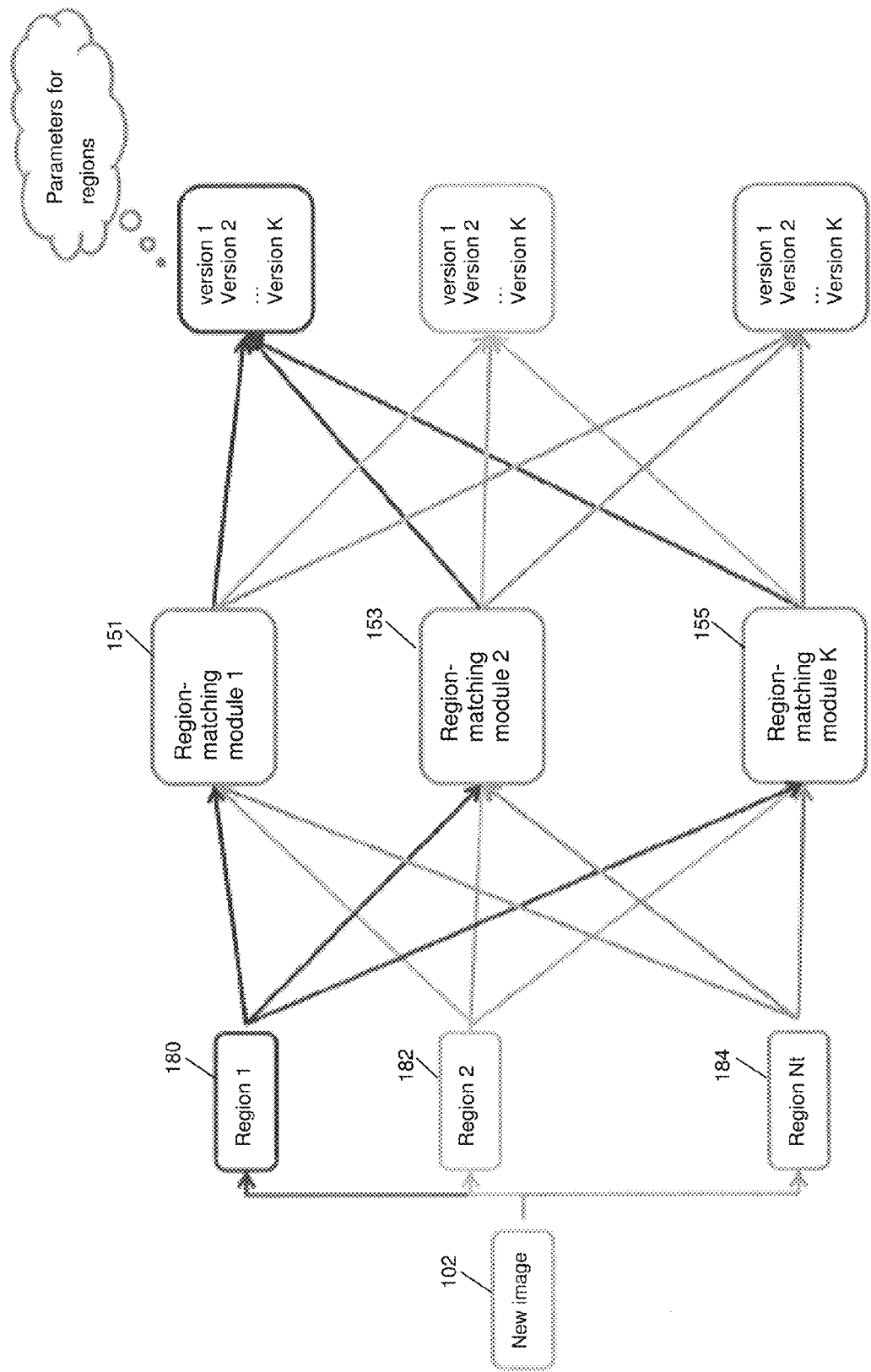
FIG. 9 is a simplified block diagram illustrating region-based parameter learning.
Figure 10:
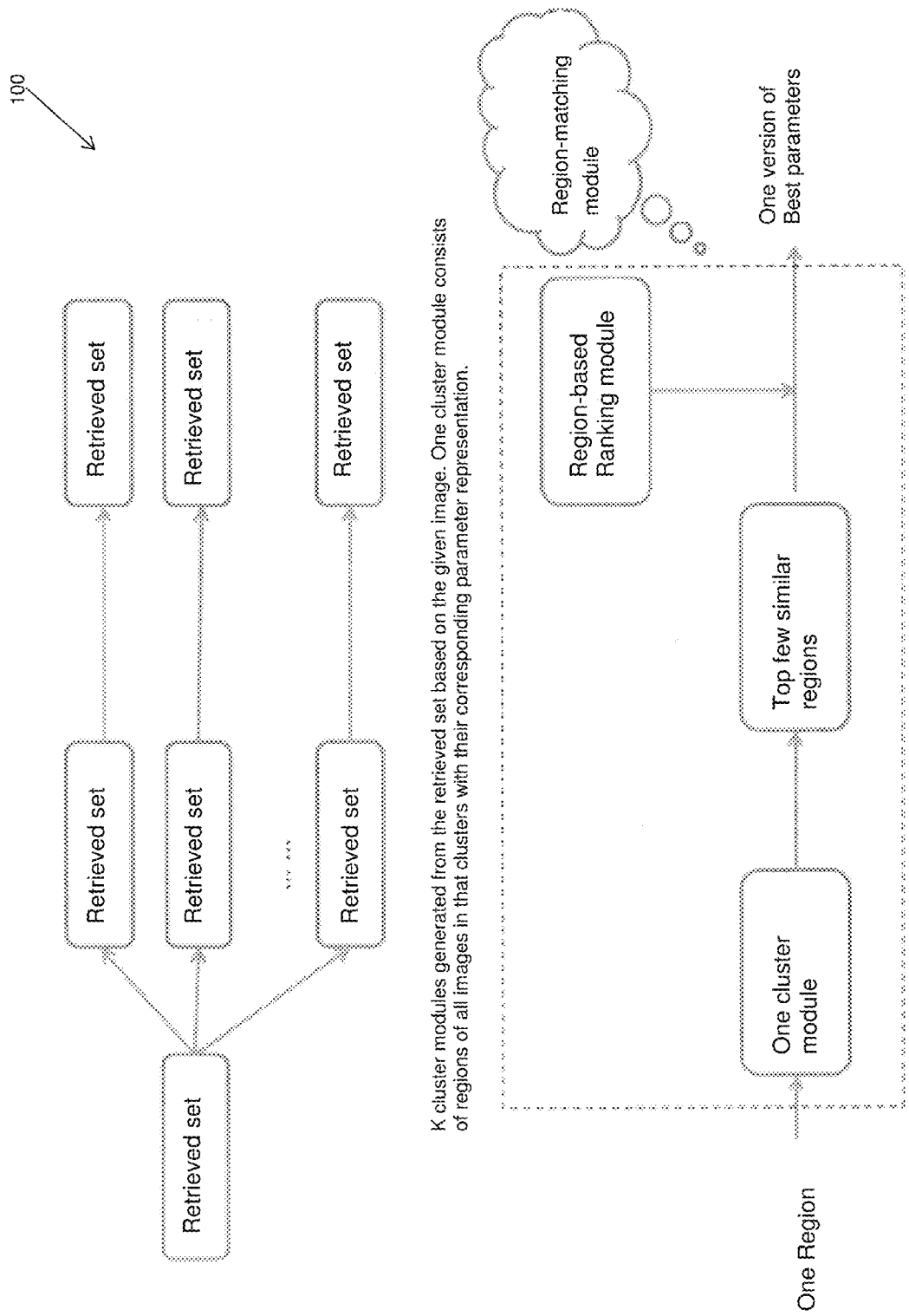
FIG. 10 is a simplified block diagram illustrating operation of a region-matching module.

In one embodiment, as shown in FIGS. 9-10, the parameter learning for image enhancement module may comprise a region-based model similar to the embodiments disclosed above. After a user uploads a new image to the system 100, similar reference images 120 are retrieved from the image collection 168 as outlined before which may be mainly based on the visual features of the images.

In the case of FIGS. 9-10, parameter vectors for different regions of a new image 102 may be learned. The techniques of image segmentation may be used to segment the new image 102 into different regions 180-184. For each region, using a region matching module 151-155 as its corresponding parameter vector may be computed. For the image retrieval set 112, images are first clustered in it into K groups (small group will be ignored and only few K large groups are kept). One way to do clustering is K-Means which can be shown in the equation below where the retrieved dataset is denoted as $\{x_l, l \in \{1, \ldots, L\}\}$ $$\mathrm{argmin} = \sum_{k=1}^{K} \sum_{l} \|x_i - \mu_k\|^2$$

where $\mu_k$ is the k-th initial cluster center.

For each cluster, regions and their parameter vectors may be generated. As a result, each cluster becomes a set of regions with their corresponding parameter vectors, which can be called to be one cluster module (see FIG. 10).

Compared with the images within the image collection 168 DB, the new image 102 is considered to have a relatively low quality. A relative ranking list can be built for the new image 102 and the images in the retrieval set 112. The new image 102 may be denoted as $x_t$ consisting of multiple regions $r_{t,i}$, $i \in \{1, \ldots, N_t\}$. For the retrieval set 112, it consists of multiple images $x_j$, $j \in \{1, \ldots, N\}$. Each of them consists of multiple regions $r_{j,k}$, $k \in \{1, \ldots, N_j\}$. Then the relative rank may be $\mathrm{rank}_{i,j,k}$: $r_{t,i} < r_{j,k}$, where $i \in \{1, \ldots, N_t\}$, $j \in \{1, \ldots, N\}$ and $k \in \{1, \ldots, N_j\}$. This relative rank is based on the assumption that for the regions with the similar contents, the regions in the DB have a higher quality. Based on the relatively ranking information, a region-based ranking model may be constructed using the training set that was collected. One way to learning the ranking model is to use the support vector machine for ranking. This model is as following:

$$\min \cdot \tfrac{1}{2}\|\omega\|^2 + C \Sigma \xi_{i,j,k,t} \tag{3}$$

$$s \cdot t \cdot r_{t,i} > r_{j,k} + 1 - \xi_{i,j,k,t} \forall i,j,k,t \tag{4}$$

$$\xi_{i,j,k,t} > 0 \forall i,j,k,t \tag{5}$$

where i∈{1, . . . , $N_t$}, j∈{1, . . . , N} and k∈{1, . . . , $N_j$}.

Processing of the above steps is shown in FIGS. 9 and 10. Given an image with its retrieval set 112, the retrieval set 112 is first grouped into clusters based on visual features and top few K clusters are selected. Then for each cluster, the parameter vectors are computed for each region 180-184 of each image. For each region 180-184 in the given image, and for each cluster, the top few most similar regions are first retrieved based on the visual features. Using the learned ranking model, the best parameter vector can be found for the given region. For the other clusters, the same operations may be applied. Finally, the enhancement parameter matrix for different regions 180-184 of the given new image 102 can be obtained. In short such a region-based model allows for further, detailed refinement of the new image 102 because it comprises modification to specific regions of the new image using regions of reference images 120, as opposed to modifying the new image 102 based upon differences in the reference images 120 and the new image 102 as a whole.

Figure 11A:
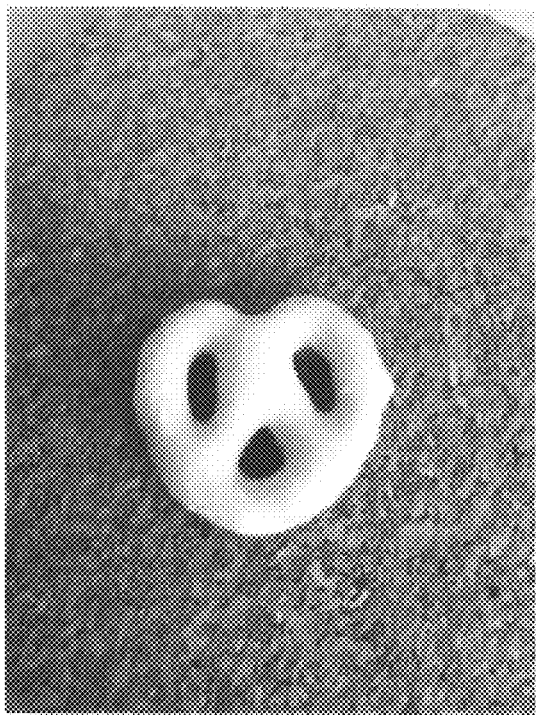
FIG. 11A is a color picture of an original image.
Figure 11B:
FIG. 11B is a color picture of an iPhone enhanced image.
Figure 11C:
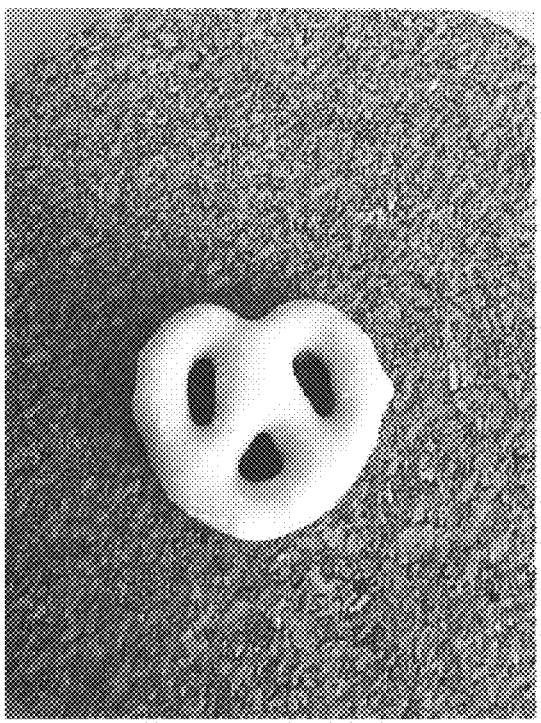
FIGS. 11C and 11D are color pictures of recommended enhancement images.
Figure 11D:
Figure 12A:
FIG. 12A is a color picture of an original image.
Figure 12B:
FIG. 12B is a color picture of an iPhone enhanced image.
Figure 12C:
FIGS. 12C and 12D are color picture of recommended enhancement images.
Figure 12D:

Comparison with iPhone's Camera:

The comparison is shown in FIGS. 11A-11D and 12A-12D. In each of the two images, FIGS. 11A and 12A are the original image, and images FIGS. 11B and 12B are the images enhanced by iPhone, FIGS. 11C and 11D and FIGS. 12C and 12D are the two versions of expected results of images by the dynamic image enhancement recommender system 100.

Application of learned parameters to a new image: Based on the parameter matrices learned from each cluster, learned parameters may be applied to the new image's regions. Each region may have K multiple parameter vectors, so multiple versions of enhancement results can be obtained.

Figure 13:
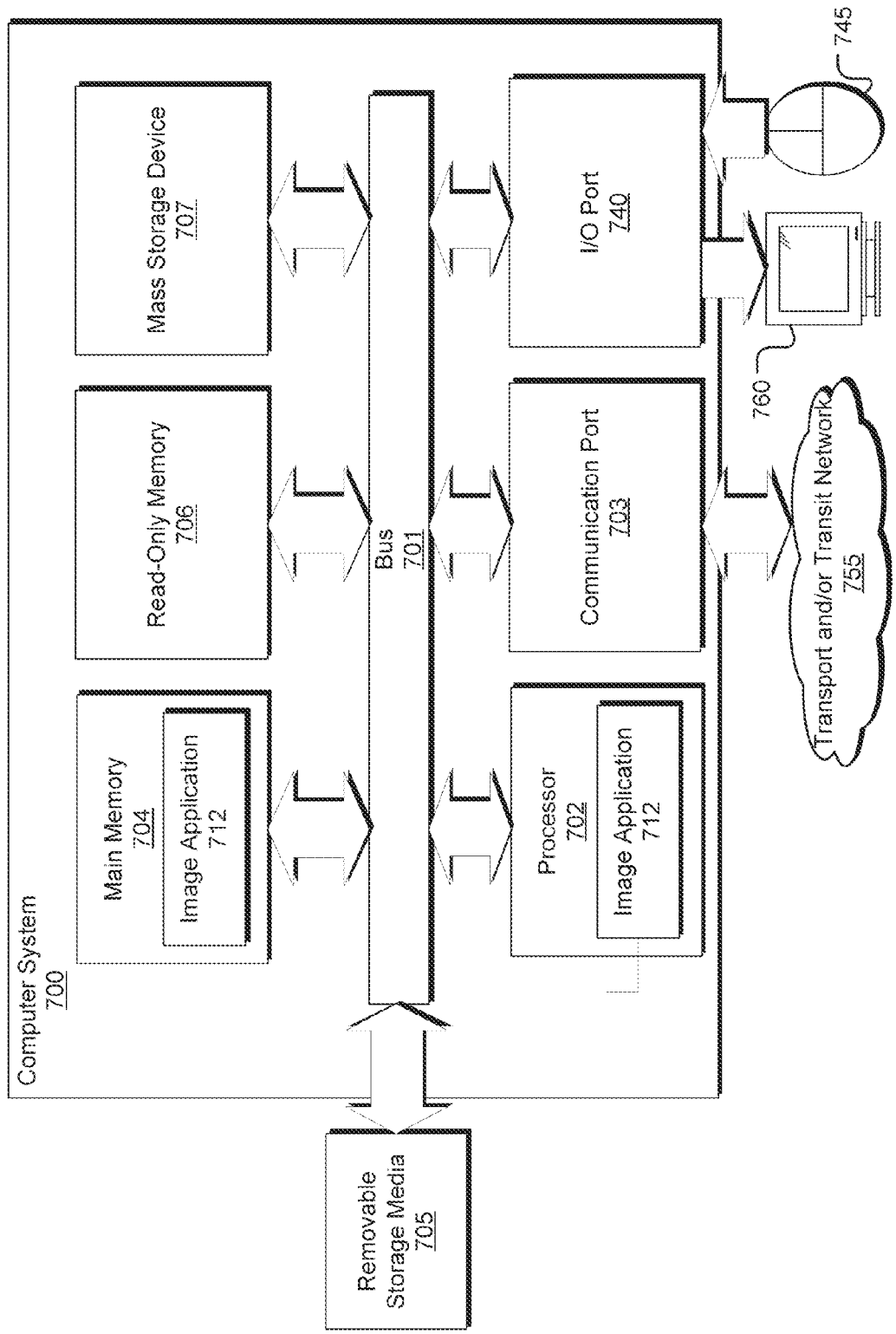
FIG. 13 illustrates an example of a computing system that may implement various services, systems, and methods discussed herein.

FIG. 13 is an example schematic diagram of a computing system 700 that may implement various methodologies discussed herein. For example, the computing system 700 may comprise an application server used to execute an image application 712 comprising certain modules discussed herein. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 200 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with at least one image application 712 that supports functionality of the system 100 discussed above. The image application 712 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the image application 712 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of creating an enhanced image, comprising: utilizing a computing device comprising at least one memory for storing instructions that are executed by at least one processor to perform the operations of:
    retrieving a plurality of known high quality images;
    receiving a new image for enhancement;
    selecting an image retrieval set from the plurality of known high quality images based upon visual similarities between the new image and certain ones of the plurality of known high quality images;
    grouping images of the image retrieval set into a plurality of clusters, each of the plurality of clusters comprising reference images sharing related predetermined visual features;
    converting reference images of a first cluster of the plurality of clusters into a color space to generate reference image color attributes;
    converting the new image into the color space to generate new image color attributes;
    computing at least one parameter based upon the new image color attributes as compared to the reference image color attributes; and
    applying the least one parameter to the new image color attributes to modify the new image color attributes and enhance the new image.

2. The method of claim 1, wherein the color attributes include color, hue, saturation, gamma, contrast, lightness, or sharpness.

3. The method of claim 1, wherein the color space includes a Hue, Saturation, Lightness (HSL) color space.

4. The method of claim 1, further comprising retrieving the plurality of known high quality images using a web crawler, wherein the known high quality images are predetermined to be known high quality based on a source of the known high quality images.

5. The method of claim 1, wherein each of the plurality of clusters is associated with respective predetermined filters.

6. The method of claim 1, wherein computing the at least one parameter further comprises:
    obtaining distributions for values of the new image color attributes and reference image color attributes; and applying a linear regression to the new image color attributes.

\* \* \* \* \*